(12) United States Patent
Munro et al.

(10) Patent No.: US 8,226,262 B2
(45) Date of Patent: *Jul. 24, 2012

(54) TIRING CONDENSING ELEMENT AND METHODS THEREOF

(75) Inventors: James F. Munro, Walworth, NY (US); Penny J. Munro, Walworth, NY (US)

(73) Assignee: Reflexite Corporation, Avon, CT (US)

( * ) Notice: Subject to any disclaimer, the term of this patent is extended or adjusted under 35 U.S.C. 154(b) by 404 days.

This patent is subject to a terminal disclaimer.

(21) Appl. No.: 12/286,455

(22) Filed: Sep. 30, 2008

(65) Prior Publication Data

US 2010/0079987 A1    Apr. 1, 2010

(51) Int. Cl.
F21V 9/16 (2006.01)
F21V 13/04 (2006.01)
F21V 7/04 (2006.01)

(52) U.S. Cl. .................. 362/231; 362/245; 362/327

(58) Field of Classification Search .................. 362/231, 362/245, 327, 555
See application file for complete search history.

(56) References Cited

U.S. PATENT DOCUMENTS

| | | | | |
|---|---|---|---|---|
| 2,908,197 | A * | 10/1959 | Wells et al. | 362/327 |
| 4,767,172 | A * | 8/1988 | Nichols et al. | 385/146 |
| 5,577,492 | A | 11/1996 | Parkyn et al. | |
| 6,177,761 | B1 * | 1/2001 | Pelka et al. | 313/512 |
| 6,328,456 | B1 | 12/2001 | Mize | |
| 6,527,411 | B1 * | 3/2003 | Sayers | 362/245 |
| 6,582,103 | B1 | 6/2003 | Popovich et al. | |
| 6,644,841 | B2 | 11/2003 | Martineau | |
| 6,679,621 | B2 | 1/2004 | West et al. | |
| 6,788,470 | B2 | 9/2004 | Chen et al. | |
| 6,803,607 | B1 * | 10/2004 | Chan et al. | 257/98 |
| 6,819,505 | B1 * | 11/2004 | Cassarly et al. | 359/726 |
| 6,974,234 | B2 | 12/2005 | Galli | |
| 7,006,306 | B2 | 2/2006 | Falicoff et al. | |
| 7,021,797 | B2 | 4/2006 | Minano et al. | |
| 7,083,313 | B2 | 8/2006 | Smith | |
| 7,172,319 | B2 | 2/2007 | Holder et al. | |
| 7,181,378 | B2 | 2/2007 | Benitez et al. | |
| 7,329,029 | B2 * | 2/2008 | Chaves et al. | 362/329 |
| 7,347,599 | B2 * | 3/2008 | Minano et al. | 362/511 |
| 7,438,447 | B2 * | 10/2008 | Holder et al. | 362/327 |
| 2003/0076034 | A1 | 4/2003 | Marshall et al. | |
| 2005/0073756 | A1 | 4/2005 | Poulsen | |
| 2006/0245173 | A1 | 11/2006 | Lockamy et al. | |
| 2010/0085747 | A1 * | 4/2010 | Munro et al. | 362/231 |

FOREIGN PATENT DOCUMENTS

WO    2007081719 A2    7/2007

* cited by examiner

*Primary Examiner* — Alan Cariaso
(74) *Attorney, Agent, or Firm* — LeClairRyan, a Professional Corporation (57) ABSTRACT

A TIRing condensing element and methods thereof includes a first section and a second section. The first section provides substantially total internal reflection of light entering at a base of the first section. The second section tapers from a first section towards an optical axis of the element extending through the second section to output light from the first section. The first and second sections are configured so a half-power angle of the light output from the second section is less than the half-power angle of the light entering the first section.

40 Claims, 12 Drawing Sheets

| | | | |
|---|---|---|---|
| DELTA-RHO | 0.02mm | | |
| INDEX | 1.46 | | |
| THETA-CRIT | 0.754509689rads | | |
| THETA-CRIT | 43.23022079degs | | |

| RHO (mm) | HEIGHT (mm) | THETA-O (DEGS) | NEXT SLOPE (DEGS) |
|---|---|---|---|
| 1.000 | 0.000 | 0.000 | 42.77 |
| 1.020 | 0.018501 | 1.039109 | 43.81 |
| 1.040 | 0.037686 | 2.075286 | 44.85 |
| 1.060 | 0.057578 | 3.109187 | 45.88 |
| 1.080 | 0.078201 | 4.141478 | 46.91 |
| 1.100 | 0.099582 | 5.172841 | 47.94 |
| 1.120 | 0.121750 | 6.203983 | 48.97 |
| 1.140 | 0.144736 | 7.235631 | 50.01 |
| 1.160 | 0.168575 | 8.268549 | 51.04 |
| 1.180 | 0.193307 | 9.303537 | 52.07 |
| 1.200 | 0.218974 | 10.341440 | 53.11 |
| 1.220 | 0.245622 | 11.383160 | 54.15 |
| 1.240 | 0.273305 | 12.429663 | 55.20 |
| 1.260 | 0.302080 | 13.481990 | 56.25 |
| 1.280 | 0.332015 | 14.541277 | 57.31 |
| 1.300 | 0.363181 | 15.608766 | 58.38 |
| 1.320 | 0.395663 | 16.685832 | 59.46 |
| 1.340 | 0.429556 | 17.774005 | 60.54 |
| 1.360 | 0.464969 | 18.875007 | 61.64 |
| 1.380 | 0.502028 | 19.990794 | 62.76 |
| 1.400 | 0.540878 | 21.123606 | 63.89 |
| 1.420 | 0.581691 | 22.276045 | 65.05 |
| 1.440 | 0.624671 | 23.451161 | 66.22 |
| 1.460 | 0.670062 | 24.652589 | 67.42 |
| 1.480 | 0.718162 | 25.884719 | 68.65 |
| 1.500 | 0.769339 | 27.152952 | 69.92 |
| 1.520 | 0.824059 | 28.464065 | 71.23 |
| 1.540 | 0.882922 | 29.826775 | 72.60 |
| 1.560 | 0.946729 | 31.252622 | 74.02 |
| 1.580 | 1.016580 | 32.757441 | 75.53 |
| 1.600 | 1.094066 | 34.363988 | 77.13 |
| 1.620 | 1.181628 | 36.107013 | 78.88 |
| 1.640 | 1.283351 | 38.044281 | 80.81 |
| 1.660 | 1.407027 | 40.284828 | 83.05 |
| 1.680 | 1.571207 | 43.083468 | 85.85 |
| 1.700 | 1.847065 | 47.374182 | 90.14 |
| 1.699 | 2.000000 | 49.646993 | 92.42 |
| 1.693 | 2.200000 | 52.422501 | 95.19 |
| 1.675 | 2.400000 | 55.093341 | 97.86 |
| 1.647 | 2.600000 | 57.646421 | 100.42 |
| 0.000 | 11.559838 | | |

| θe | SOLID ANGLE SUBTENDED BY 2θe | SOLID ANGLE BEYOND θe | % OF HEMISPHERE BEYOND θe | SOURCE EMISSION BEYOND θe | APPROX % OF LIGHT EMITTED BEYOND θe |
|---|---|---|---|---|---|
| 0 | 0.0000 | 6.2832 | 100.00% | 100.00% | 100.00% |
| 2 | 0.0038 | 6.2794 | 99.94% | 96.51% | 96.45% |
| 4 | 0.0153 | 6.2679 | 99.76% | 93.02% | 92.80% |
| 6 | 0.0344 | 6.2488 | 99.45% | 89.55% | 89.06% |
| 8 | 0.0611 | 6.2220 | 99.03% | 86.08% | 85.24% |
| 10 | 0.0955 | 6.1877 | 98.48% | 82.64% | 81.38% |
| 12 | 0.1373 | 6.1459 | 97.81% | 79.21% | 77.48% |
| 14 | 0.1866 | 6.0965 | 97.03% | 75.81% | 73.56% |
| 16 | 0.2434 | 6.0398 | 96.13% | 72.44% | 69.63% |
| 18 | 0.3075 | 5.9757 | 95.11% | 69.10% | 65.72% |
| 20 | 0.3789 | 5.9043 | 93.97% | 65.80% | 61.83% |
| 22 | 0.4575 | 5.8257 | 92.72% | 62.54% | 57.99% |
| 24 | 0.5432 | 5.7400 | 91.35% | 59.33% | 54.20% |
| 26 | 0.6359 | 5.6473 | 89.88% | 56.16% | 50.48% |
| 28 | 0.7355 | 5.5477 | 88.29% | 53.05% | 46.84% |
| 30 | 0.8418 | 5.4414 | 86.60% | 50.00% | 43.30% |
| 32 | 0.9547 | 5.3284 | 84.80% | 47.01% | 39.87% |
| 34 | 1.0742 | 5.2090 | 82.90% | 44.08% | 36.54% |
| 36 | 1.2000 | 5.0832 | 80.90% | 41.22% | 33.35% |
| 38 | 1.3320 | 4.9512 | 78.80% | 38.43% | 30.29% |
| 40 | 1.4700 | 4.8132 | 76.60% | 35.72% | 27.36% |
| 42 | 1.6139 | 4.6693 | 74.31% | 33.09% | 24.59% |
| 44 | 1.7634 | 4.5197 | 71.93% | 30.53% | 21.96% |
| 46 | 0.9185 | 4.3647 | 69.47% | 28.07% | 19.50% |
| 48 | 2.0789 | 4.2043 | 66.91% | 25.69% | 17.19% |
| 50 | 2.2444 | 4.0388 | 64.28% | 23.40% | 15.04% |
| 52 | 2.4149 | 3.8683 | 61.57% | 21.20% | 13.05% |
| 54 | 2.5900 | 3.6932 | 58.78% | 19.10% | 11.23% |
| 56 | 2.7697 | 3.5135 | 55.92% | 17.10% | 9.56% |
| 58 | 2.9536 | 3.3296 | 52.99% | 15.20% | 8.05% |
| 60 | 3.1416 | 3.1416 | 50.00% | 13.40% | 6.70% |
| 62 | 3.3334 | 2.9498 | 46.95% | 11.71% | 5.50% |
| 64 | 3.5288 | 2.7544 | 43.84% | 10.12% | 4.44% |
| 66 | 3.7276 | 2.5556 | 40.67% | 8.65% | 3.52% |
| 68 | 3.9295 | 2.3537 | 37.46% | 7.28% | 2.73% |
| 70 | 4.1342 | 2.1490 | 34.20% | 6.03% | 2.06% |
| 72 | 4.3416 | 1.9416 | 30.90% | 4.89% | 1.51% |
| 74 | 4.5513 | 1.7319 | 27.56% | 3.87% | 1.07% |
| 76 | 4.7631 | 1.5200 | 24.19% | 2.97% | 0.72% |
| 78 | 4.9768 | 1.3063 | 20.79% | 2.19% | 0.45% |
| 80 | 5.1921 | 1.0911 | 17.36% | 1.52% | 0.26% |
| 82 | 5.4087 | 0.8745 | 13.92% | 0.97% | 0.14% |
| 84 | 5.6264 | 0.6568 | 10.45% | 0.55% | 0.06% |
| 86 | 5.8449 | 0.4383 | 6.98% | 0.24% | 0.02% |
| 88 | 6.0639 | 0.2193 | 3.49% | 0.06% | 0.00% |
| 90 | 6.2832 | 0.0000 | 0.00% | 0.00% | 0.00% |

*FIG. 12*

TIRING CONDENSING ELEMENT AND METHODS THEREOF

FIELD OF THE INVENTION

This invention generally relates to condensing elements and, more particularly, to monolithic, totally internally reflecting (TIRing) condensing elements and methods thereof.

BACKGROUND

Typically, a light emitting diode (LED) emits light into a full hemisphere. For some applications, such as for display lighting or general room lighting, such an output can be desirable. However, for other applications, such as for a flashlight or a vehicular headlight, a more focused output is required.

To provide this narrower output light distribution angle, the light output from the LED often is condensed. A variety of devices have been developed to condense light from an LED, such as devices that utilize a compound parabolic collector. Unfortunately, these prior devices have a number of drawbacks including being expensive to produce, physically large, and inefficient.

SUMMARY

A condensing element in accordance with embodiments of the present invention includes a first section and a second section. The first section provides substantially total internal reflection of light entering at a base of the first section. The second section tapers from a first section towards an optical axis of the element extending through the second section to output light from the first section. The first and second sections are configured so that a half-power angle of the light output from the second section is less than the half-power angle of the light entering the first section.

A method for making a condensing element in accordance with embodiments of the present invention includes forming a first section that provides substantially total internal reflection of light entering at a base of the first section. A second section is formed which tapers from the first section towards an optical axis extending through the second section to output light from the first section. The first and second sections are formed so that a half-power angle of the light output from the second section is less than the half-power angle of the light entering the first section.

Accordingly, the present invention provides a condensing element that may be optically coupled to one or more LED sources to provide low-loss luminance concentration. Additionally, the present invention provides a condensing element that is easy and inexpensive to manufacture and which has a compact design. Further, another benefit of the present invention is that the condensing element improves the efficiency of the light source.

BRIEF DESCRIPTION OF THE DRAWINGS

FIG. 12 is an exemplary table of emissions.

DETAILED DESCRIPTION

Figure 1:
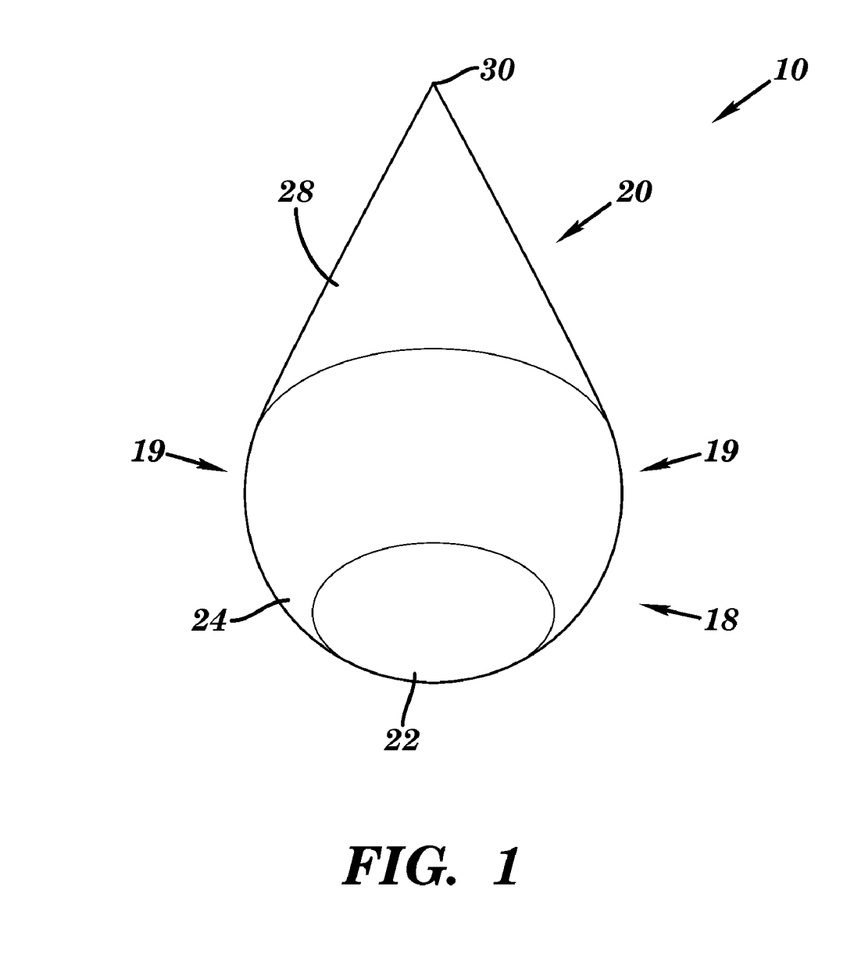
FIG. 1 is a perspective view of a TIRing condensing element in accordance with exemplary embodiments of the present invention.
Figure 2:
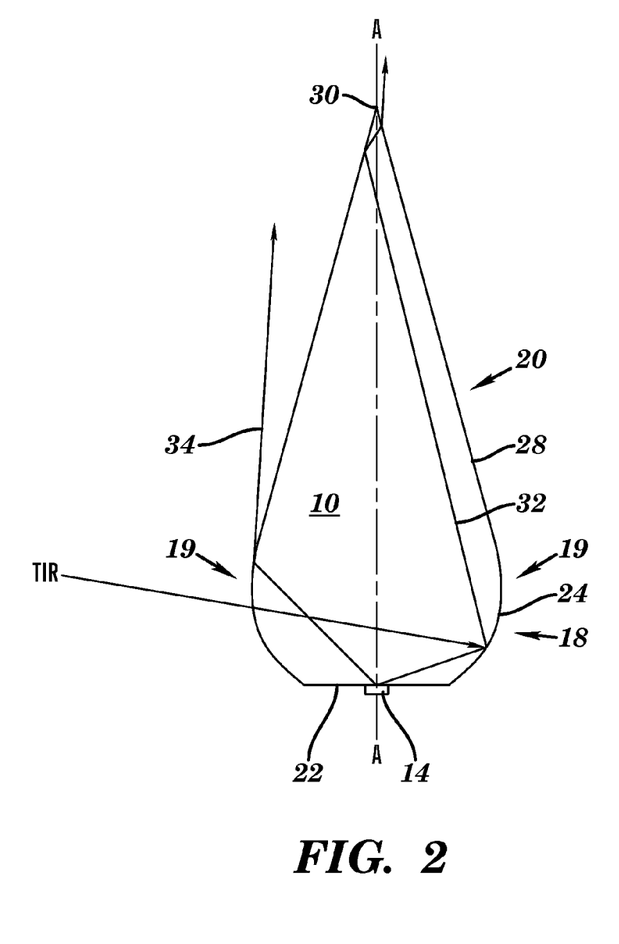
FIG. 2 is a cross-sectional view of the TIRing condensing element shown in FIG. 1 coupled to an LED die.

A TIRing condensing element 10 in accordance with embodiments of the present invention is illustrated in FIGS. 1 and 2. The TIR condensing element 10 includes a first section 18 and a second section 20, although other numbers and types of condensing elements each made of other numbers and types of sections and components which are integrally formed or otherwise joined together can be used. The present invention provides a number of advantages including providing a condensing element 10 that may be optically coupled to one or more LED sources to provide low-loss luminance concentration.

Referring more specifically to FIGS. 1 and 2, the condensing element 10 is formed as a monolithic structure, although the condensing element can formed as two or more structures. The condensing element 10 may be made of glass, although the condensing element could be made of other types and numbers of materials, such as a polymer. Additionally, the condensing element 10 has a refractive index between about 1.4 and 1.7, although the condensing element could include other ranges for the refractive index.

The condensing element 10 has a first section 18 and a second section 20, although the condensing element 10 could have other types and numbers of sections in other configurations. The first and second sections 18 and 20 are integrally formed together, although these sections can be formed or connected together in other manners.

The first section 18 has a one-sided, rotationally symmetric configuration, although the first section 18 may have other types and numbers of sides, shapes, and configurations, such as four-sided, six-sided, eight-sided, triangular, square, and rectangular and could have an asymmetric configuration. The first section 18 has a base 22 and a sidewall 24, although the first section 18 may have other numbers and types of top, bottom and side walls. The base 22 has a plano configuration to facilitate the attachment of the LED 14, although the base 22 may have other configurations, such as convex or concave.

The sidewall 24 is formed to have a curvature that provides substantially total internal reflection of light entering at the base 22 of the first section 18, although the sidewall could have other properties and configurations. In particular, the slope angle of the sidewall 24 is selected so that light from the LED 14 will be substantially totally internal reflected at all locations on the sidewall 24.

Figure 3:
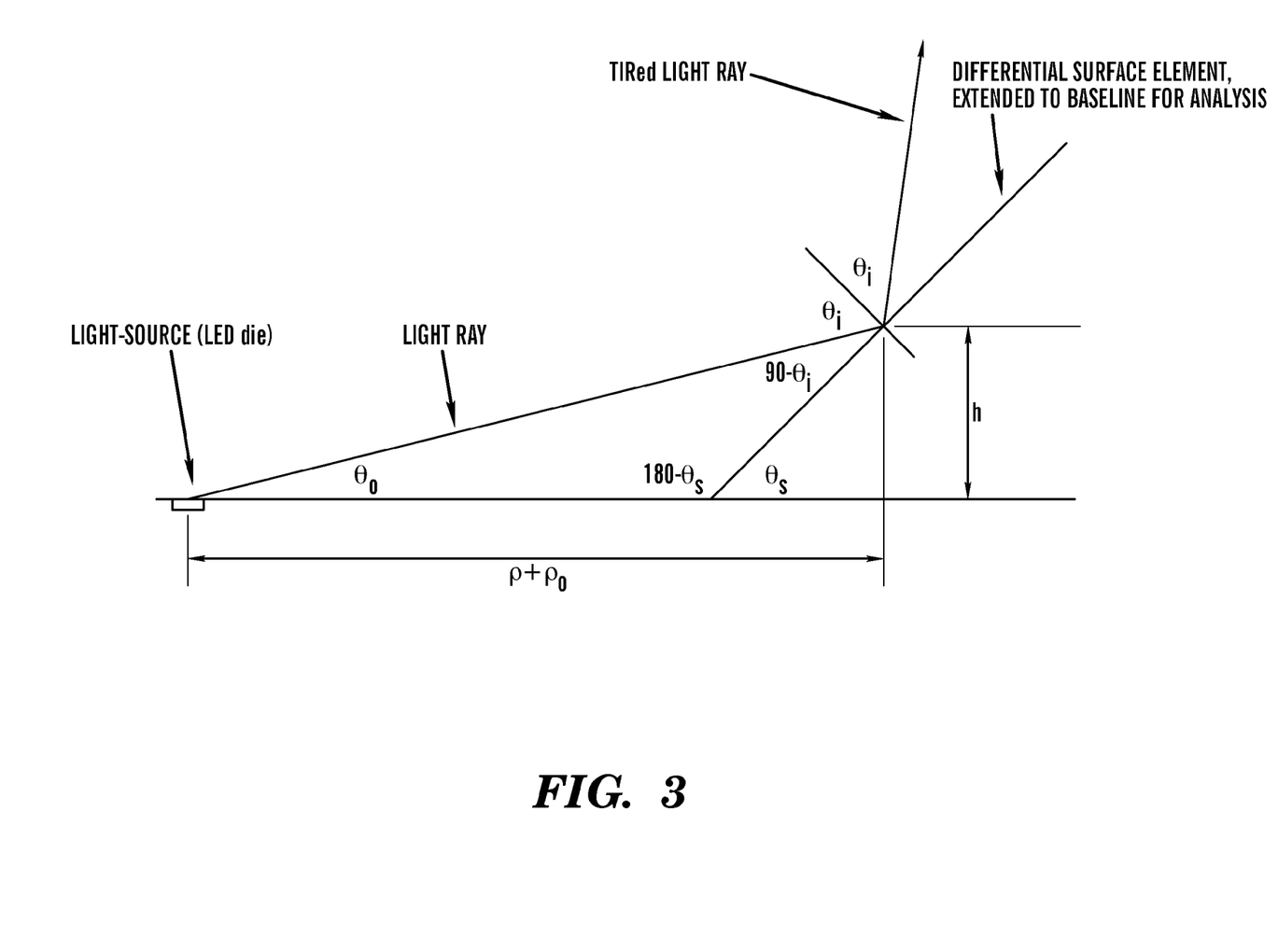
FIG. 3 is a diagram of an example of geometrical calculations for generating a TIRing section in a condensing element.

A diagram illustrating an example of the geometrical calculations for determining the curvature of the sidewall 24 to generate TIR in the first section 18 is illustrated in FIG. 3. In these calculations, the variables are:

$\theta_0$: The light exit angle from the LED with respect to the base surface;

$\theta_s$: The instantaneous angle of a differential TIRing surface element with respect to the base surface;

$\theta_i$: The angle of incidence that the light makes with the differential surface element;

h: The vertical distance from the base to the point of incidence;

$\rho_0$: The lateral distance from the LED to the edge of the plano base area;

$\rho$: The lateral distance from the edge of the piano base area to the point of incidence.

Figure 4:
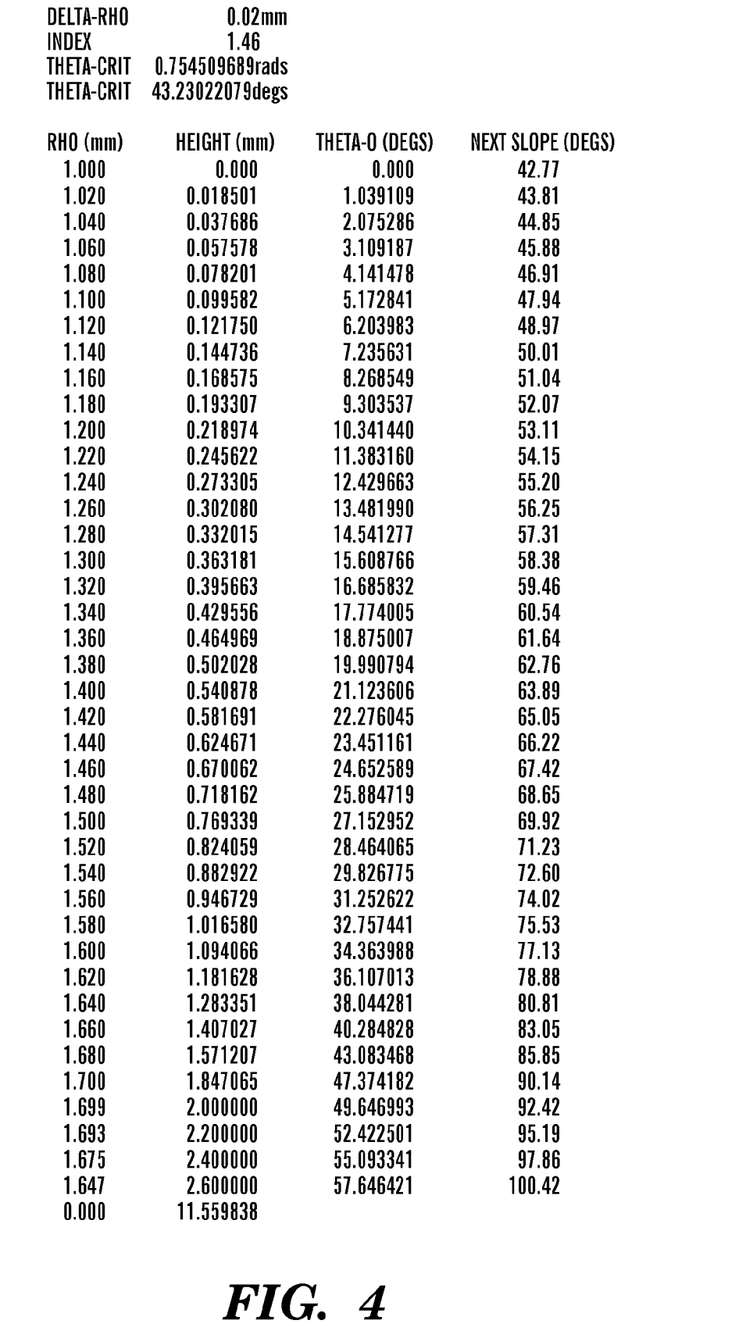
FIG. 4 is a spreadsheet of examples of coordinates for the profiles of a TIRing condensing element in accordance with an exemplary embodiment of the present invention.

Additionally, in these calculations the critical angle, $\theta_c$, is defined so that $\theta_i > \theta_c + 4°$ for TIR to occur. The +4° is a buffer angle, $\theta_B$, selected to provide a buffer for robustness, although other angular buffer amounts or no buffer could be used. By inspection, $\theta_s = 90 + \theta_0 - (\theta_c + 4)$, and from Snell's Law $\theta_c = \sin^1(1/n)$, where n is the refractive index of the optical element. Also, $h = (\rho + \rho_0) \tan \theta_0$, for entry into a spreadsheet for numerical stepwise computation of values, $h_{next} = h_{prev} + (\Delta \rho) \tan \theta_{sprev}$. Assuming $\rho_0$ is 1.0 mm in this example, a spreadsheet with the coordinates of the profiles for the condensing element 10 is illustrated in FIG. 4.

The second section 20 has a rotationally symmetric configuration, although the second section 20 may have other configurations and other types and numbers of sides, such as four-sided, six-sided, eight-sided, triangular, square, and rectangular and could have an asymmetric configuration. The transition or boundary from or between the first section 18 to the second section 20 is illustrated by the arrow 19. The second section 20 also has a sidewall 28 which is formed to be substantially linear in cross-section and tapers to an endpoint 30 that intersects with the optical axis A-A, although the second section 20 may have other numbers and types of walls in other shapes and configurations, such as concave, convex, parabolic, elliptical, or otherwise characterized by a polynomial. The sidewall 28 provides at least internal reflection and refraction of light so that at least a half-power angle of the light output from the second section 20 is less than the half-power angle of the light entering the first section 18. The angle between the two half-power points of the input or output light is defined as the half-power angle or beam width. The half-power angle of the light entering the first section is greater than or equal to about forty degrees about the optical axis A-A, although other half-power angle distributions could be used and the optical axis could have other orientations which are not substantially perpendicular to the base 22. Additionally the optical emission profile from the second section 20 has a half-power angle less than or equal to five degrees about the optical axis A-A, although other half-power angle distributions could be used, such as is less than or equal to about twenty degrees, and again the optical axis could have other orientations which are not substantially perpendicular to the base 22.

To broaden the distribution of condensed light output from the second section 20, the sidewall 28 may be non-linear in cross-section, textured, and/or made from a light diffusing material (also known as a bulk scattering or bulk diffusing material) although other manners for broadening the distribution could be used.

As shown in FIG. 2, an LED 14 is attached to the base 22 at the intersection with optical axis A-A, although other numbers and types of light sources attached at other locations and in other manners can be used. For example, the LED 14 may be partially or fully encapsulated in the base 22 of condensing element 10. Additionally, by way of example a plurality of LEDs, such as a red LED, green LED, and blue LED, may be provided to optically couple with the base 22. To ensure TIR in the first section 18, the LEDs can be provided about the center of the base 22 and spaced less than 10 mm apart from one another, although other spacing can be used, such as 0.5 mm apart.

The LED 14 is positioned to transmit light into condensing element 10. The LED 14 may be a colored light source, such as red, green or blue or contain phosphor to emit a white colored light. Another way in which to generate white light may include providing red, green, and blue colored LEDs in combination. The present invention may utilize a single LED 14, although other numbers and/or types of light sources could be used with the condensing element 10. However, when using more than one LED light source, the LEDs are close to one another and near the optical axis A-A of the condensing element 10, although other configurations and locations can be used. In such a case, the buffer angle, $\theta_B$, may be increased to accommodate the larger effective size of the sources. The LED 14 is made from inorganic material, although other types of light sources can be used, such as a light source made from organic materials (e.g., OLEDs). LED 14 is in chip or die format, although the light source can come in other formats, can have leads, and can subsequently be incorporated in the condensing element 10.

The operation of the condensing element 10 will now be described with reference to FIGS. 1-3. A light ray 32 which exits obliquely from the LED 14 is transmitted into the first section 18 of condensing element 10 and strikes the sidewall 24. The curvature of the sidewall 24 provides total internal reflection of this transmitted light which is eventually directed towards the sidewall 28 of second section 20. The light strikes the sidewall 28 of the second section 20 and is internally reflected until the angle of incidence of the light from LED 14 is less than the critical angle. At this point, the condensed light is output from the second section 20. The half-power angle of the light output from the second section 20 is less than the half-power angle of the light entering the first section 18.

Another light ray 34 exiting the LED 14 at a non-oblique angle is transmitted into the first section 18 and strikes the sidewall 28 above the transition or boundary 19 between the first section 18 and second section 28. The sidewall 28 at this point allows the light to refract and transmit through the side of the condensing element 10, although light striking the sidewall 28 at other angles may be internally reflected as illustrated with light ray 32. As can be seen, light rays 32 and 34 exit the second section 20 substantially condensed with respect to the optical axis A-A.

Figure 5:
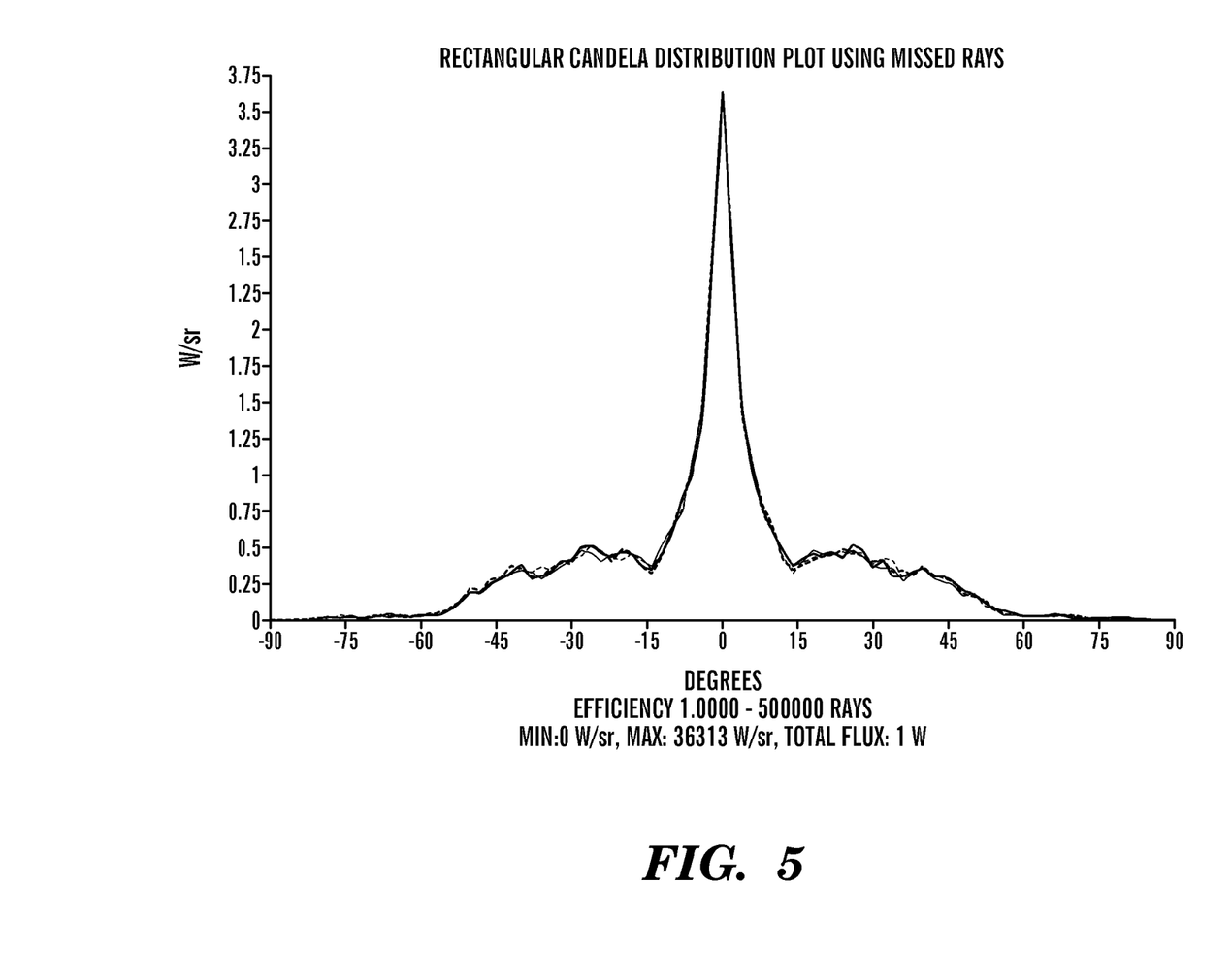
FIG. 5 is a ray trace output graph showing a rectangular candela distribution of condensed output light in accordance with an exemplary embodiment of the present invention.
Figure 6:
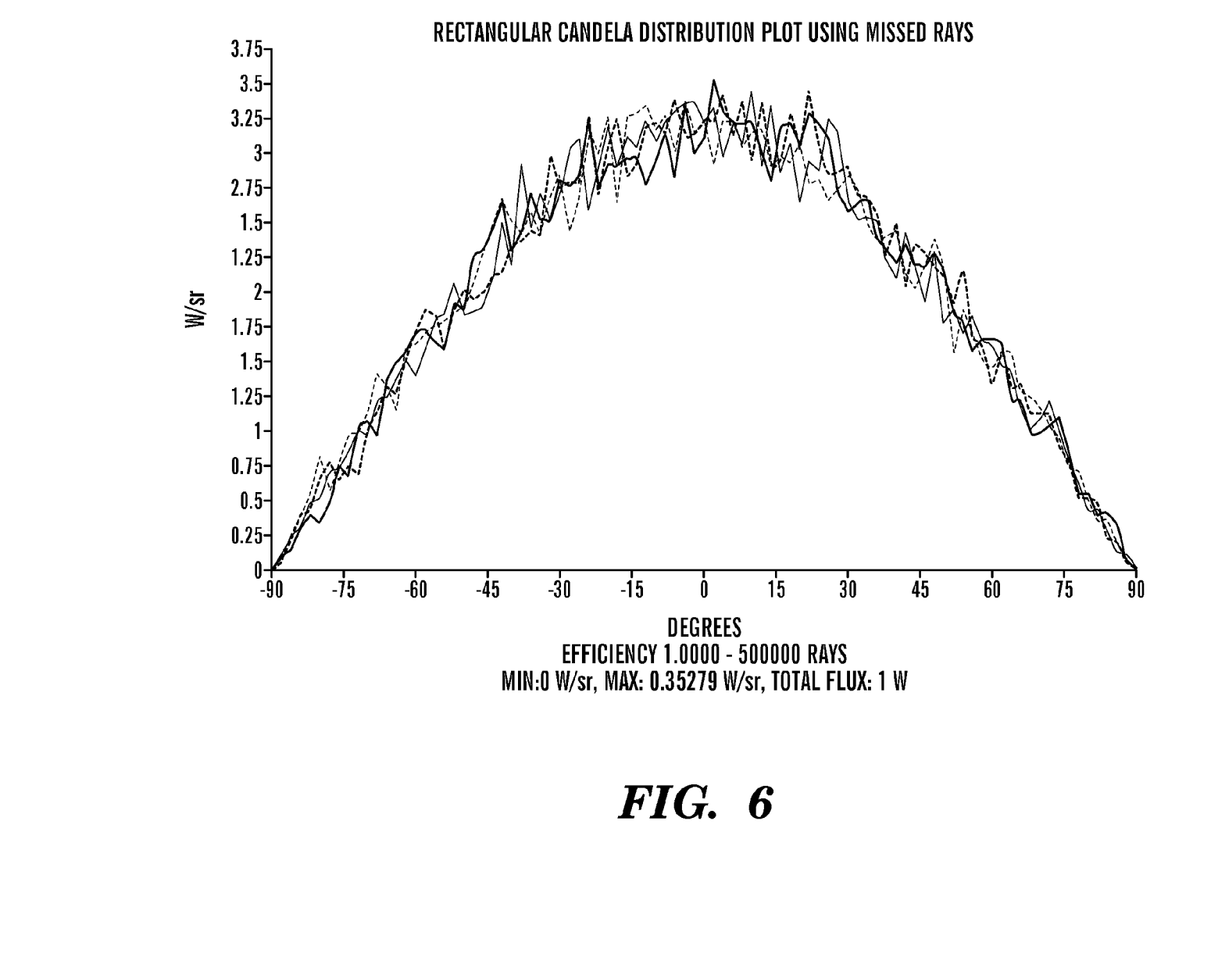
FIG. 6 is a ray trace output graph showing a rectangular candela distribution of light without a TIRing condensing element in accordance with the present invention.

The effectiveness of the present invention is demonstrated by the ray trace shown in FIG. 5. For comparison purposes, FIG. 6 presents a similar plot of the output light in which the condensing optical element was removed. Note the 10× change in the vertical scale. Further note that the total flux output in FIG. 5, at 1 Watt, is the same as that in FIG. 6. That is, owing to the total internal reflecting nature of the device, absolutely no light is absorbed, and all light is directed into a forward direction.

Accordingly, the condensing element 10 produces a substantially condensed light output. Additionally, the condensing element 10 as described herein is easy and inexpensive to produce with manufacturing procedures, such as injection molding. Further, the resulting condensing element 10 has a compact design that is easy to use.

Accordingly, other exemplary embodiments described herein involve a monolithic, compact and highly efficient condensing optical element that is well suited to condense the light emitted from two or more substantially separated LED die. These embodiments locate light sources at spatially separated bases sections of the condensing optical element. Typically, but not necessarily, one source is provided per base section. FIGS. 7-10 illustrate exemplary embodiments of condensing optical elements utilizing this multi-base section concept.

Figure 7:
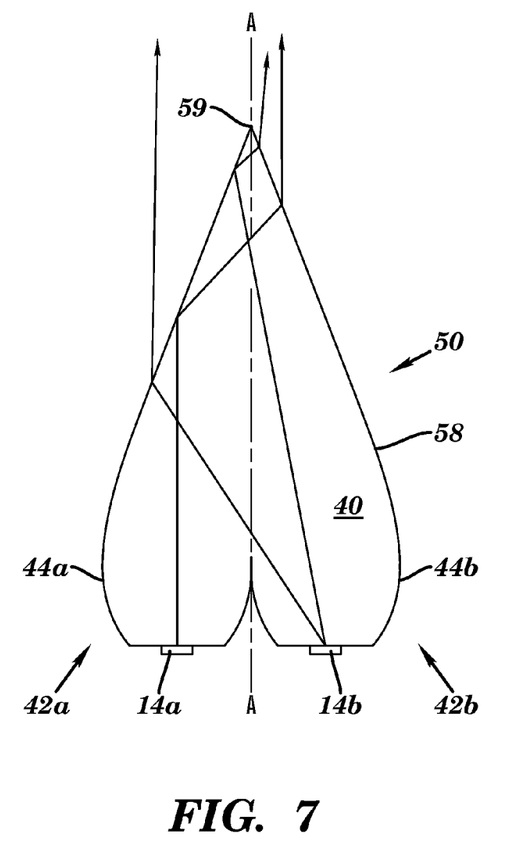
FIG. 7 is a cross-sectional view of a two-base TIRing condensing element in accordance with exemplary embodiments of the present invention.

Referring to FIG. 7, a cross-section of a two-source TIRing condensing optical element 40 in accordance with an exemplary embodiment is illustrated. As can be seen from FIG. 7, TIRing condensing optical element 40 includes two types of sections: a lower first section including base sections 42a and 42b that are curved (in cross-section); and an upper part including a second section 50 having at least one sidewall 58 with a substantially linear, cross-sectional surface, although other configurations for sidewall 58 can be used such as concave, convex, parabolic, elliptical, or otherwise mathematically characterized by a polynomial. The base sections 42a and 42b extend separately from the second section and are arranged about the optical axis A-A. The sidewall 58 tapers to an endpoint 59 that intersects with the optical axis A-A, although the second section 50 may have other numbers and types of walls in other shapes and configurations. As with previous embodiments, described above, light that is incident on a curved sidewall 44a or 44b of respective separate base sections 42a and 42b of the lower base section is nominally TIRed, and not transmitted through the surface of the condensing optical element 40. By design, light incident on a sidewall 58 of the second section at an angle of incidence that is less than the critical angle will refract through the surface and exit in a direction that is substantially parallel to the optical axis A-A.

If it is desired to broaden the distribution of light output from a multi-based condensing optical element, such as element 40, the sidewall 58 of the second section 50 may be formed to be non-linear in cross-section, textured, and/or made from a light diffusing material (also known as a bulk scattering or bulk diffusing material), although other manners for broadening the distribution could be used.

As shown in FIG. 7, a light source 14a and 14b is respectively provided on each of the separate base sections 42a and 42b. Each light source 14a, 14b typically comprises single LED emitting a single color (e.g., red, green or blue), although the color of light source 14a may be different from the color of the light source 14b, and more than one LED of a same or different color may be used at each base section 42a and 42b. Similar to the single base embodiments, described above, when providing more than one LED to a base section 42a and 42b, the LEDs should be spaced closely together about the center of the base section to prevent light from exiting a lower base section 42a or 42b of the condensing optical element 40.

Figure 8:
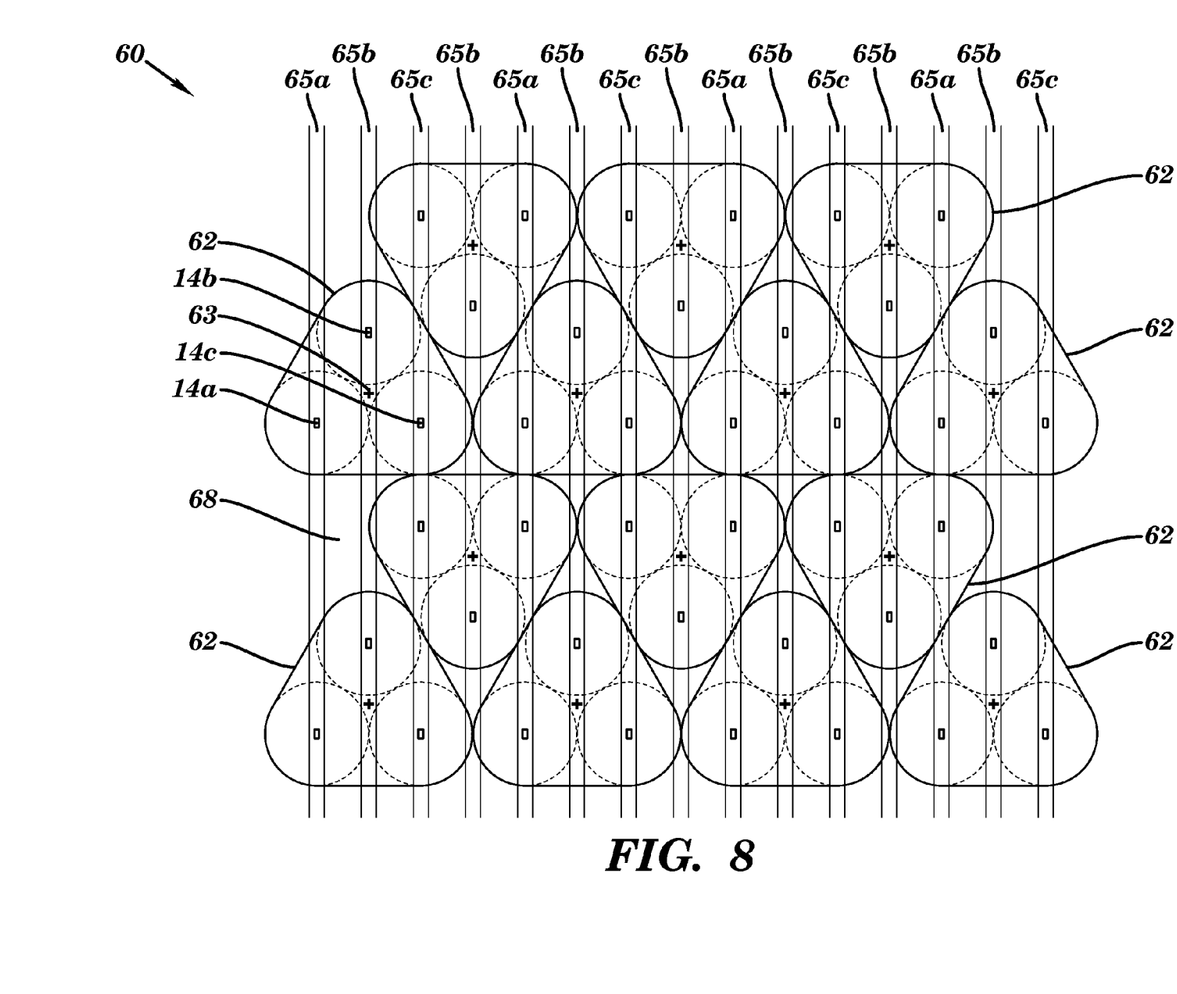
FIG. 8 is a top-view of an array of three-base TIRing condensing elements in accordance with exemplary embodiments of the present invention.

The multi-base concept may be extended to more than two separate base sections. For instance, FIG. 8 illustrates a top-view drawing of an exemplary embodiment in which "triangular shaped" three-base TIRing condensers 62 with three first sections which merge into one second section are arranged in an array 60. In this example, blue, green, and red LED die 14a, 14b and 14c, respectively, are arranged on a LED die circuit assembly 68 and optically coupled to respective base sections 64a, 64b and 64c of a three-base TIRing condenser 62, although the same color other color emitters, and a higher number of LEDs may be provided at each base section. Each TIRing condenser 62 will substantially mix the three colors into white light. The white light is output from the optical condenser in a direction substantially parallel to the optical axis 63 of the optical condenser, which is shown as a cross centrally located with respect to the base sections 64a, 64b and 64c.

The LED die can be arranged along parallel strips (i.e., columns or rows), whose pitch and spacing facilitate the placement of the die substantially centered within each base section of each TIRing condenser, although condensing optical element 62 may be arranged in other ways, such as an individual unit, non-symmetrically with other optical elements, or in linear or other types of two-dimensional arrays. The exemplary array shown in FIG. 8 includes a sequence of blue LED die strips 65a, green LED die strips 65b, and red LED die strips 65c. The LED die arrangement of FIG. 8 is conducive to electrical power routing to the LEDs, heat removal from the die, as well as low-cost (even roll-to-roll) assembly of the LED die circuit assembly.

It is to be appreciated that in any embodiment, optically coupling the LEDs with the base sections can be carried out in a number of ways. For example, the optical condensing element can be adhered to an LED using optically transmissive adhesive material, an LED can include leads and the LED can be encapsulated in the optical condensing element at the base segment with the leads exposed, or the optical condensing element can be mechanically fastened to or held against the LEDs with or without an intervening optically conductive paste.

Figure 9:
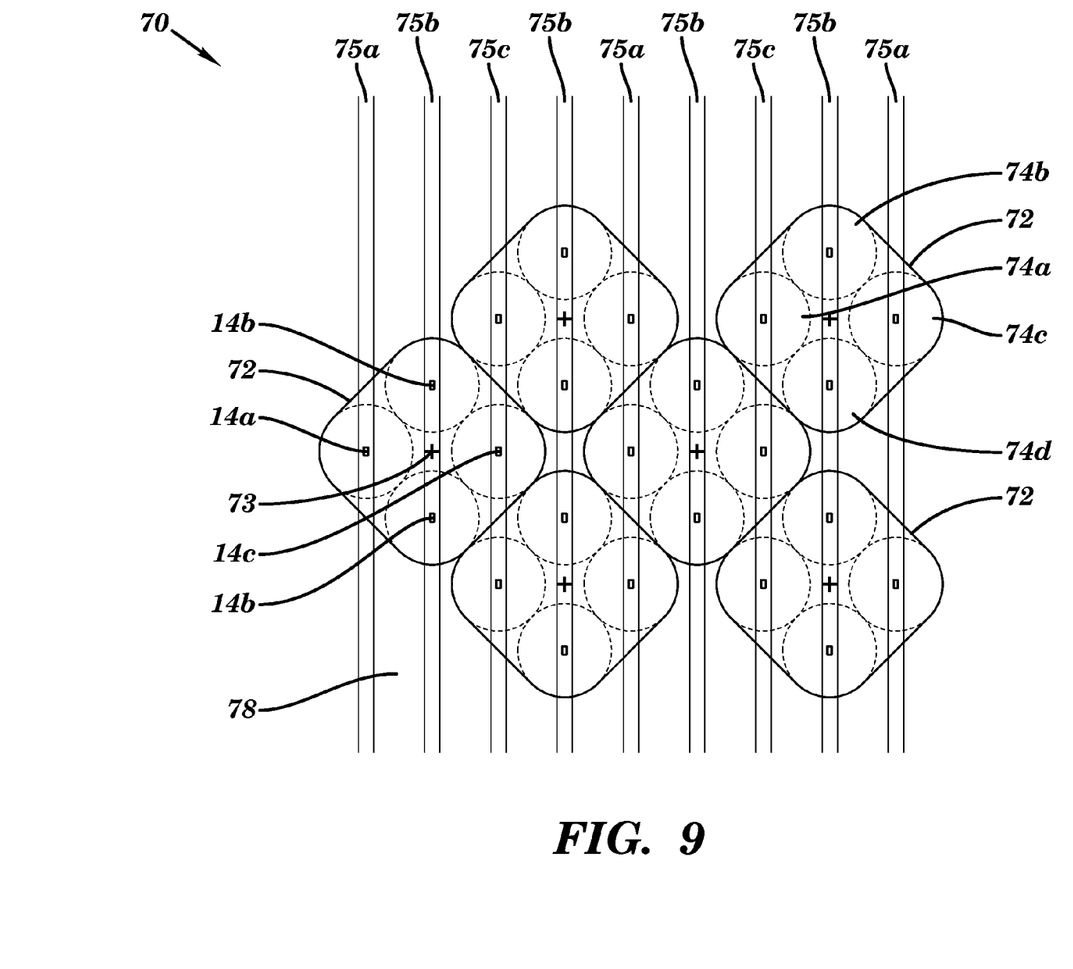
FIG. 9 is a top-view of an array of four-base TIRing condensing elements in accordance with exemplary embodiments of the present invention.

Referring to FIG. 9, yet another example of a multi-base section condensing optical element is illustrated. In this arrangement, an array 70 includes a plurality of "diamond-shaped" four-base TIRing condensers 72 with four first sections which merge into one second section and which are arranged on an LED die circuit assembly 78. The exemplary array 70 shown in FIG. 9 includes a sequence of blue LED die strips 75a, green LED die strips 75b, and red LED die strips 75c, although condensing optical element 72 may be arranged in other ways, such as an individual unit, non-symmetrically with other optical elements, or in linear or other types of two-dimensional arrays. In this example, blue, green, and red LED die 14a, 14b and 14c, respectively, are arranged on a LED die circuit assembly 68 and optically coupled to respective base sections 74a, 74b, 74c and 74d of a four-base TIRing condenser 72, although the same color other color emitters, and a higher number of LEDs may be provided at each base section. The base sections 74a, 74b, 74c and 74d of each four-base TIRing condenser 72 are arranged about an optical axis 73.

In the FIG. 9 example, each TIRing condenser 72 will substantially mix the three colors into white light. However, the four-base TIRing condenser 72 allows for an additional light source, such as an additional LED die of one color to improve the white coloring. For example, to make white light, typically two green sources are needed for every red and blue source. To this end, the four-base diamond-shaped TIRing condenser is well suited to mixing the light from these four sources into condensed white light.

Of course, the variations as discussed above with respect to TIRing optical condensers 40 and 62 may similarly be incorporated in four-base TIRing condenser elements 72 having a diamond configuration, and in similar n-base TIRing condenser element configurations where n is greater four.

Figure 10:
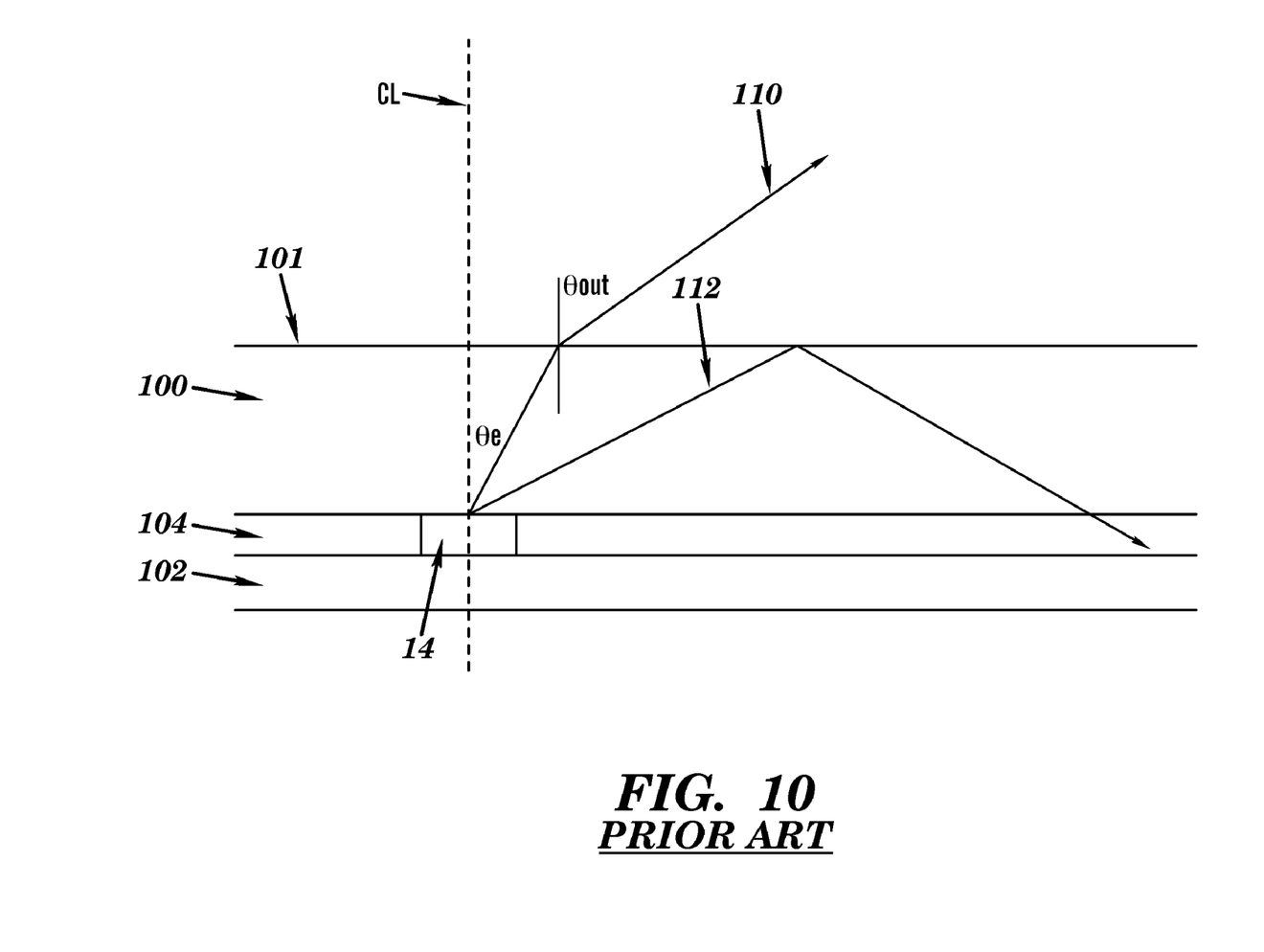
FIG. 10 is a cross-sectional view of a prior art LED die-based light source with two exemplary emitted light rays.

Referring to FIG. 10, a cross-sectional view of a prior art LED die-based light source with two exemplary emitted light paths is illustrated. In this example, the LED die 14 is encapsulated under a substantially transparent layer 100 of polymer material, such as PET, which seals the LED die 14 from environmental contaminants yet allows the light rays emitted from the LED die 14 to propagate through it. An opposing side of the LED die 14 is coupled to an electrical conductor 102 which is used to supply power to the LED die 14 and also to conduct heat away from the LED die 14 generated during operation. The electrical conductor 102 is generally opaque and substantially non-reflective to light rays. An adhesive 104 is placed alongside the LED die 14 to bond the electrical conductor 102, LED die 14, and the transparent layer 100 together which are all in optical contact with one another.

In operation, when power is supplied to the LED die 14 by the electrical conductor 102, light rays are emitted by the LED die 14 into the transparent layer 100. One of these rays is a non-obliquely emitted ray 110 which is emitted into the transparent layer 100 at angle θe with respect to the centerline CL. The emitted ray 110 propagates through the transparent layer 100 and exits into the surrounding medium, such as air, at angle θout in accordance with Snell's Law. Another one of these rays is another non-obliquely emitted ray 112 which is emitted into the transparent layer 100 at an oblique angle. When the emitted ray 112 reaches surface 101 of the transparent layer 100, TIR occurs and the ray 112 is reflected back on the substantially non-reflective conductor 102 where it is substantially absorbed. Accordingly, a portion of the rays which are emitted obliquely by the LED die 14 are lost.

Figure 11:
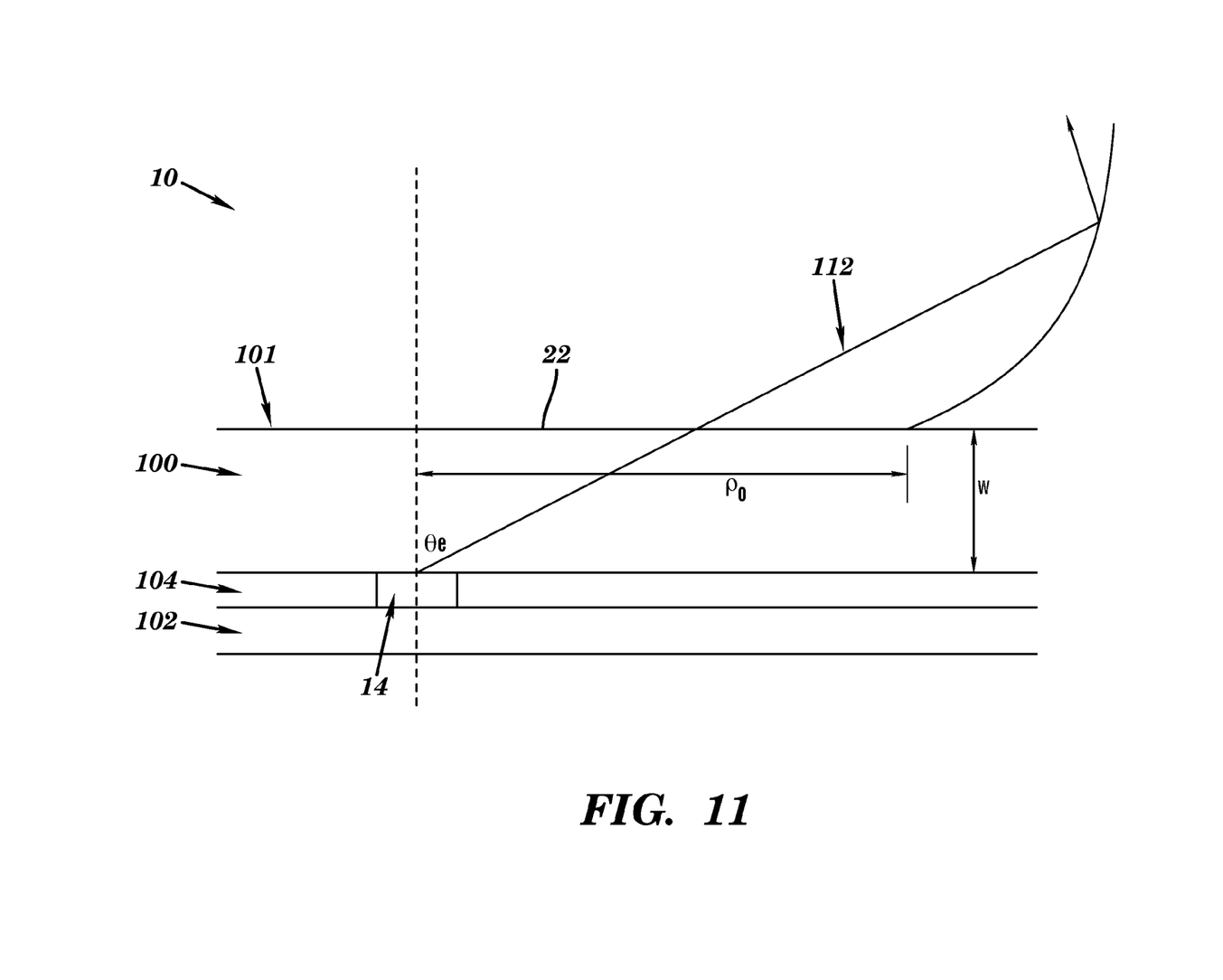
FIG. 11 is a partial, cross-sectional view of a TIRing condensing element in accordance with exemplary embodiments of the present invention coupled to an LED die-based light source along with an exemplary emitted light ray.

Referring to FIG. 11, a partial, cross-sectional view of a TIRing condensing element in accordance with exemplary embodiments of the present invention coupled to an LED die-based light source along with an exemplary emitted light ray is illustrated. In these embodiments, the LED die 14 also is encapsulated under a substantially transparent layer 100 of polymer material, such as PET, which seals the LED die 14 from environmental contaminants yet allows the light rays emitted from the LED die 14 to propagate through it, although other types and numbers of materials with other properties can be used. An opposing side of the LED die 14 is again coupled to an electrical conductor 102 which is used to supply power to the LED die 14 and also to conduct heat away from the LED die 14 generated during operation, although other manners for coupling power to the LED die 14 and for dissipating heat can be used. The electrical conductor 102 is generally opaque and substantially non-reflective to light, although other types of conductors with other properties can be used. An adhesive 104 is placed alongside the LED die 14 to bond the electrical conductor 102, LED die 14, and the transparent layer 100 together which are all in optical contact with one another, although other manners for optically coupling these elements together can be used. A base 22 of a TIRing condensing element 10, as previously illustrated and described herein, is installed on and is in optical contact with surface 101 of the transparent layer 100.

In operation, when the same ray 112 described earlier with reference to FIG. 10 is emitted by the LED die 14 into the transparent layer 100 at an oblique angle, there is no TIR of the ray 112 at the surface 101 of the transparent layer 100 below the condensing element 10. Instead, the ray 112 simply transmits through the surface 101 and into the TIRing condensing element 10. Once the ray 112 is in the TIRing condensing element 10, the ray 112 propagates in the manner previously illustrated and described herein. Accordingly, with the addition of the base 22 of TIRing condensing element 10 on the surface 101 of the transparent layer 100, more of the light rays emitted by the LED die 14 are collected by the TIRing condensing element 10 improving the overall extraction efficiency of the optical system. In these embodiments, extraction efficiency equals the total light passing through a transparent layer divided by the total light entering the transparent layer.

By way of example only, a numerical example to illustrate a typical efficiency improvement with the base 22 of the TIRing condensing element 10 on the surface 101 of the transparent layer 100 will now be described. If the refractive index of the transparent layer 100 is 1.556, then its critical angle is 40.0°. To facilitate the calculations, a table of emissions, in percent, as a function of θe, in degrees, is presented in FIG. 12. The emissions are assumed to be Lambertian in nature, which follow a cosine-law drop-off with angle θe, and the amount of light emitted into angles above θe in accordance with the cosine-law is presented in the "Source Emission Beyond θe" column. The light collection is also a function of solid-angle, whose calculations are presented in the "Solid Angle . . . " and "Hemisphere . . . " columns. The rightmost column, "% of Light Emitted Beyond θe" is the multiplication of the cosine-law column and "% of Hemisphere Beyond θe" column, and is the column of interest in computing collection efficiencies of the TIRing condensing element 10.

Again, assuming in this particular example, the critical angle is 40.0°, then from the rightmost column of this table 27.36% of the light emitted by the LED die 14 lies outside the 40° critical angle and will be TIR'ed. Accordingly, at this critical angle 72.64% of the light will not be TIR'ed.

Next, if the base 22 of the condensing element 10 is now on the surface 101 of the transparent layer 100 and in this particular example the radius of the base 22, $\rho_o$, is 1.0 mm and the width w of the transparent layer 100 is 0.1 mm, the collection angle of the emitted light θe is then $\tan^{-1}(1/0.1)=84.3°$. From the rightmost column of this table, at 84°, only 0.06% of the light emitted from the LED die 14 will miss the base 22 and TIR at the surface 101 of the transparent layer 100. In other words, 99.94% of the light emitted by the LED die 14 into transparent layer 100 will be collected by the TIRing condensing element 10, which is a substantial improvement in efficiency.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as may be specified in the claims. Accordingly, the invention is limited only by the following claims and equivalents thereto.

What is claimed is:

1. A condensing element comprising:
   a plurality of first sections that provides substantially total internal reflection of light entering at a base of each of the plurality of the first sections;
   a second section which tapers from each of the first sections towards an optical axis of the element extending through the second section to output light from the plurality of first sections, the plurality of first sections and the second sections are configured so a half-power angle of the light output from the second section is less than the half-power angle of the light entering each of the first sections, wherein the bases of the plurality of first sections are provided about the optical axis;
an array of light sources positioned proximate to the base of each of the plurality of first sections, wherein at least one light source of the array of light sources is provided at the base of each of the plurality of first sections to transmit light into the respective first section of the condensing element; and
at least one transparent layer of polymer material in between and in optical contact with the array of light sources and the condensing element.

2. The element as set forth in claim 1 wherein the plurality of first sections have at least one sidewall with a curvature to provide the substantially total internal reflection of light entering at a respective base of the first section.

3. The element as set forth in claim 1 wherein the second section has at least one sidewall which is substantially linear in cross-section and provides internal reflection and refraction of the light from the plurality of first sections.

4. The element as set forth in claim 3 wherein the at least one sidewall of the second section tapers to an end point at the optical axis for the condensing element.

5. The element as set forth in claim 1 wherein the second section has at least one sidewall that is at least one of non-linear in cross-section, textured, and made from a light diffusing material.

6. The element as set forth in claim 1 wherein the half-power angle of the light output from the second section is less than or equal to about twenty degrees about the optical axis.

7. The element as set forth in claim 6 wherein the half-power angle of the light entering the plurality of first sections is greater than or equal to about forty degrees about the optical axis.

8. The element as set forth in claim 1 wherein each base of the plurality of first sections is substantially planar.

9. The element as set forth in claim 1 further comprising at least one light source positioned to transmit light into the first section of the condensing element.

10. The element as set forth in claim 1, wherein the condensing element increases an extraction efficiency of the transmitted light passing through the at least one transparent layer of polymer material from the array of light sources.

11. The element as set forth in claim 1 wherein the at least one light source of the array of light sources provided at each base is at least one light emitting diode.

12. The element as set forth in claim 1 further comprising multiple light sources positioned adjacent the central axis of each base of the plurality of first sections to transmit light into the respective first section of the condensing element.

13. The element as set forth in claim 12 wherein the multiple light sources comprise a red light source, a green light source, and a blue light source.

14. The element as set forth in claim 1 wherein the plurality of first sections and the second section of the condensing element are integrally formed together.

15. The element as set forth in claim 1 wherein the base comprises a plurality of separate base sections provided about the optical axis, each of the base sections integrally formed with the second section and including a respective first section providing substantially total internal reflection of light entering at a respective base section.

16. The element as set forth in claim 15 wherein a light source is provided at each the base section to transmit light into the respective first section of the condensing element.

17. The element as set forth in claim 16 wherein the light sources are light emitting diodes.

18. The element as set forth in claim 1 wherein the number of base sections is greater than or equal to two.

19. The element of claim 1 wherein condensed light output from the second section is white.

20. A method for making a condensing element the method comprising:
forming a plurality of first sections that provides substantially total internal reflection of light entering at a base of each of the plurality of the first sections;
forming a second section which tapers from a each of the first sections towards an optical axis of the element extending through the second section to output light from the plurality of first sections, the plurality of first sections and the second section are configured so a half-power angle of the light output from the second section is less than the half-power angle of the light entering each of the first sections, wherein the bases of the plurality of first sections are provided about the optical axis;
providing an array of light sources positioned proximate to the base of each of the plurality of first sections, wherein at least one light source of the array of light sources is provided at the base of each of the plurality of first sections to transmit light into the respective first section of the condensing element; and
providing at least one transparent layer of polymer material in between and in optical contact with the array of light sources and the condensing element.

21. The method as set forth in claim 20 further comprising forming the plurality of first sections to have at least one sidewall with a curvature to provide the substantially total internal reflection of light entering at a respective base of the first section.

22. The method as set forth in claim 20 further comprising forming the second section to have at least one sidewall which is substantially linear in cross-section and provides internal reflection and refraction of light from the plurality of first sections.

23. The method as set forth in claim 22 wherein the forming the second section further comprises forming the at least one sidewall of the second section to taper to an end point at the optical axis of the condensing element.

24. The method as set forth in claim 20 wherein the forming the second section further comprises forming the at least one sidewall of the second section to be at least one of non-linear in cross-section, textured, and made from a light diffusing material.

25. The method as set forth in claim 20 wherein the half-power angle of the light output from the second section is less than or equal to about twenty degrees about the optical axis.

26. The method as set forth in claim 25 wherein the half-power angle of the light entering the plurality of first sections is greater than or equal to forty degrees about the optical axis.

27. The method as set forth in claim 20 wherein each base of the plurality of first sections is formed substantially planar.

28. The method as set forth in claim 20 further comprising providing at least one light source at the base to transmit light into the first section of the condensing element.

29. The method as set forth in claim 20 wherein the condensing element increases an extraction efficiency of the transmitted light passing through the at least one transparent layer of polymer material from the the array of light sources.

30. The method as set forth in claim 20 wherein the at least one light source of the array of light sources provided at each base is at least one light emitting diode.

31. The method as set forth in claim 20 further comprising providing multiple light sources at each base and adjacent the central axis of each base of the plurality of first sections to transmit light into the respective first section of the condensing element.

32. The method as set forth in claim 31 wherein the multiple light sources comprise a red light source, a green light source, and a blue light source.

33. The method as set forth in claim 20 further comprising integrally forming the plurality of first sections and the second section of the condensing elements together.

34. The method as set forth in claim 20 wherein forming the first section includes forming a plurality of separate base sections provided about the optical axis, each of the base sections formed integrally with the second section and including a respective the first section providing substantially total internal reflection of light entering at a respective base section.

35. The method as set forth in claim 34 further comprising providing a light source at each the separate base section to transmit light into the respective first section of the condensing element.

36. The method as set forth in claim 35 wherein the light sources are light emitting diodes.

37. The method as set forth in claim 20 wherein the number of first sections is greater than or equal to two.

38. The method of claim 20 wherein condensed light output from the second section is white.

39. The element as set forth in claim 1 further comprising an electrical conductor coupled to the array of light sources.

40. The method of claim 20 further comprising optically coupling an electrical conductor to the array of light sources.

* * * * *